Aug. 6, 1929.  E. D. EBY  1,723,846

INSULATED CABLE JOINT

Filed March 10, 1925

Inventor:
Eugene D. Eby,
by His Attorney.

Patented Aug. 6, 1929.

1,723,846

UNITED STATES PATENT OFFICE.

EUGENE D. EBY, OF PITTSFIELD, MASSACHUSETTS, ASSIGNOR TO GENERAL ELECTRIC COMPANY, A CORPORATION OF NEW YORK.

INSULATED CABLE JOINT.

Application filed March 10, 1925. Serial No. 14,519.

The present invention relates to the transmission of electric energy and more especially to the construction of insulating joints for high potential insulated conductor cables designed to be installed underground.

High potential underground electric cables in use at the present time generally consist of a stranded copper conductor encased in a large number of concentric cylinders of treated cloth or paper in the form of strips or tapes. These strips or tapes are wound thereon very uniformly and with greatest care in order to exclude air, moisture and other foreign matter, and to break joints between the windings of successive layers, and also impregnated with liquid insulation. These layers wound on tapes form about the conductor an insulating incasement by which the flow of electric current is confined to the conductor, and in order to protect the insulation it is encased in an air and watertight sheath, usually a lead pipe formed in place thereon.

On account of practical considerations of transportation and handling, underground cables are made in relatively short lengths, which after installing underground from manhole to manhole are connected by insulated joints.

To make these insulated joints it is necessary to remove the sheathing for a considerable distance back from each end, remove the insulating material for a short distance to expose the end portions of the conductors and connect them by a splicing sleeve and solder. The insulation of the joint is usually accomplished by either hand or jig wrapping thereon of bulk material, such as cloth or paper tapes or candle wicking, and a section of lead sheathing applied over the joint and soldered to the main sheathing of the cable. In spite of the fact that the utmost pains and care are taken in the making of these joints, the insulated joints have been found uniformly to be the weakest links in any underground electric circuit.

The object of my invention is the provision of an improved insulated joint for sheathed electric cables in which practically all parts shall be factory made so that the defects, incident to hand-made joints, shall be avoided and the pains and labor of installation greatly reduced and simplified.

Figure 1:
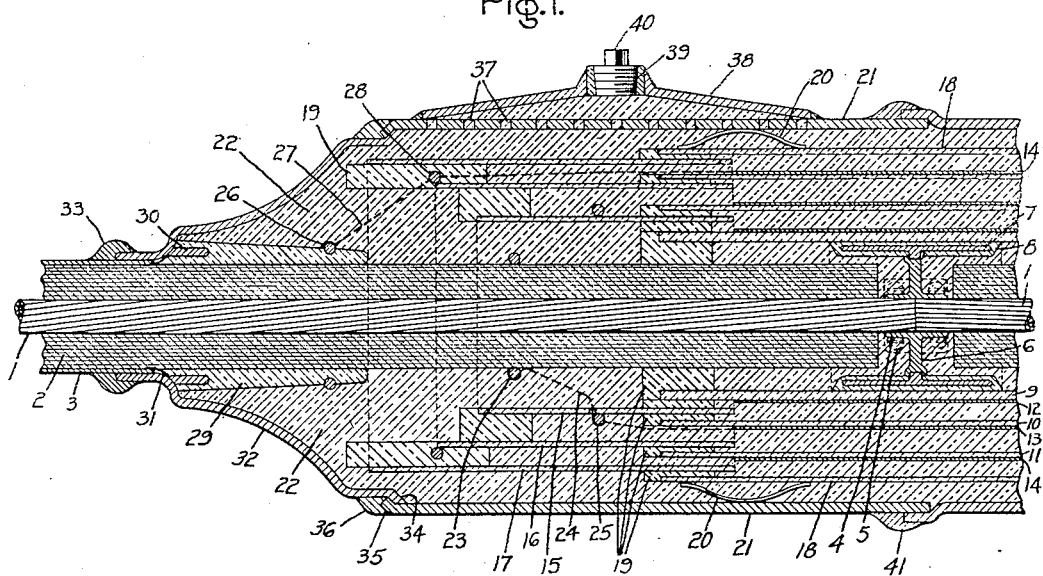
Figure 2:
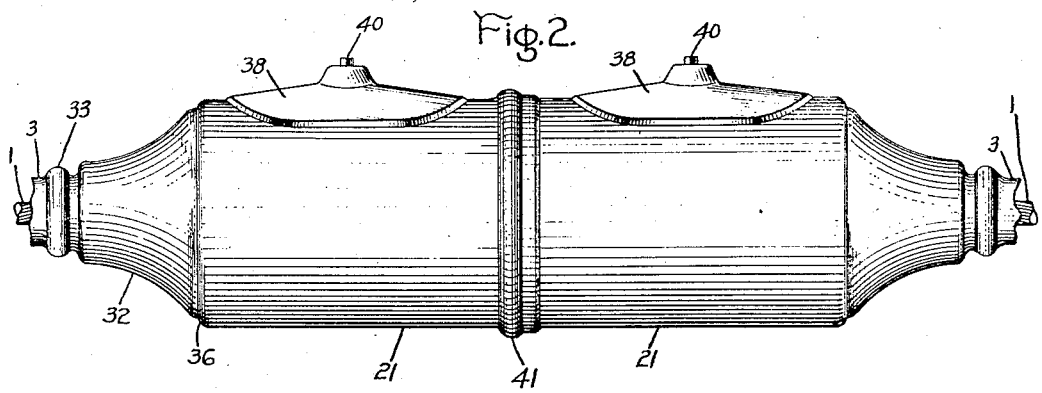

One embodiment of the invention is shown in the accompanying drawing in which Fig. 1 is a longitudinal section of one-half of an improved insulating joint, and Fig. 2 is a side elevation of the complete joint drawn to a reduced scale.

The stranded copper conductor 1, the insulating tape wrappings 2 and the lead sheath 3 are of the general construction as above set forth.

The ends of the two conductor sections 1 to be joined are bared of their insulation for a distance of about one inch and united by a split metal clamp 4, the members of which are drawn together by screws or bolts 5. Solder is poured into the clamp end about the conductor ends to effect a good electrical joint between the cable sections. The clamp 4 is provided with a central projection 6 in the form of a bracket or spokes which electrically connect with and support at their outer ends a shield insert 7 comprising a metal cylinder encased in moulded compound 8 of high insulative value, such as synthetic resin. This cylindrical shield is of greater diameter than the cable insulation 2 and of a length to extend over the ends thereof. Surrounding and concentric with the metal insert 7 are a plurality of spaced insulating barriers or cylinders 9, 10 and 11, such as paper impregnated with liquid resin and heat treated. The central portions of the insulating cylinders 9, 10 and 11 are encased in shields or layers of sheet metal 12, 13 and 14, such as thin copper. A set of extension cylinders 15, 16 and 17 of similar insulating material, but without metal shield encasements, interfit with their outer ends and an auxiliary cylinder 18 also unencased in metal is spaced centrally outside the main cylinders 9, 10 and 11.

The means for supporting the several insulating cylinders in spaced relation consist of blocks or keys 19 of impregnated wood inserted between them at circumferential intervals. Spring guides 20 are interposed between the outer insulating cylinder 18 and the outside shell 21. The space between the parts above referred to is filled with oil or other liquid insulation 22.

The sheet metal shields or wrappings 12, 13 and 14 are respectively located in the electrostatic field between the outer shell 21 and the shield insert 7 in direct contact with the conductor cable 1 so that they assume or carry electrical potentials of approximately equal differences between the cable and grounded shell 21. In the arrangement shown the shield 14 operates under a potential of twenty-five per cent of the total carried by the conductor cable, shield 13 under a potential of fifty per cent, and shield 12 under a potential of seventy-five per cent of the total. The size and location of these shields are not designed materially to alter the potential distribution radially between the insert shield 7 and the outer sheath shell 21, but their respective locations are selected with a view to securing a source of electrostatic potential which is employed in charging metal parts distributed along the path of least electrical resistivity (longitudinally of the outer surface of the solid insulating wrappings 2) so as to establish zones of uniform differences of potential along that path.

A metal ring 23 is located about half way of the length of the exposed insulating wrappings 2 and connected by lead wires 24 to the intermediate shield 13. An auxiliary ring 25 mounted on the extension cylinder 15 is employed to facilitate the making of the lead wire connections. A second metal ring 26 is similarly connected to the outer shield 14 by lead wires 27 and the second auxiliary ring 28. The ring 26 instead of being mounted directly upon the wrappings 2 is carried on a collar 29 of moulded insulation and is located half way between the ring 23 and the end of the cable sheath 3.

The distribution of the potential of the inner shield 12 along the wrapped insulation 2 is in the vicinity of the end edges of the shield and accordingly has no particular need for a metallic connection between the wrapper surface and the shield, but if very careful distribution be desired a ring connection for the shield 12 similar to ring connection 23 would be provided half way between the latter and the end edge of the insert shield 7.

The collar 29 is made to fit very snugly upon the outer surface of the insulating wrappings 2 so as to avoid air pockets, etc., by making its bore somewhat less in diameter than that of the outer wrapping surface, and by removing one or two of the wrappings short of the final position of the collar a wedging action is produced between them upon driving the collar home. For the purpose of enclosing in effect the end of the lead sheath 3 within solid insulation, the collar 29 is provided with a metal insert ring 30 at its outer end which is soldered to a thin metal spinning 31 having an end forced under the end of the sheath 3 and soldered thereto.

The outer casing of the joint comprises a pair of cylindrical shells 21 and trumpet-shaped end shells 32 of spun or cast metal. The end shells 32 are so shaped as to establish substantially uniform potential distribution along the field of electrical stress.

The central apertures in the end shells 32 are of a size to slide freely over the cable sheath 3 and are adapted to be soldered thereto by wiped joints 33. The peripheral edges 34 of the shells 32 are rabbeted to interfit with inturned flanges 35 on the ends of the cylindrical shells 21 to which they are soldered by wiped joints 36. The cylindrical shells 21 are provided along their upper elements with rows of small holes 37 over which are secured domes 38 having threaded openings 39 at the top thereof through which liquid insulation 22 may be poured to fill the unoccupied spaces of the joint, the small holes 37 serving in this pouring operation to cause the liquid to trickle down upon the interior parts without tending to entrap air as would be the case of deposit of a mass of liquid quickly, and after the pouring operation is completed they permit any air that may not have escaped during the filling operation to pass up outside the walls of the shells 21. The threaded openings 39 are normally closed by plugs 40 and the meeting ends of the shells 21 are united by a wiped joint 41.

To install my insulated joint, the various annular parts 9, 10, 11, 18, 15, 16, 17, 19, 25, 28 and 32 are threaded over the cable ends to be joined and pushed back out of the way. The lead sheath 3 is stripped from each section the necessary distance, in the neighborhood of two feet in the construction shown, and the ends of the insulating wrappings 2 removed to expose about one inch of the conductor ends.

After the sheath 3 has been removed from the cable sections, care is necessary to prevent any foreign matter coming in contact with the exposed insulation. One or two outer layers of insulating wrappings 2 are removed, as above set forth, insulating collars 29 with inserts 30 and attached spinnings 31 forced home, with spinnings 31 inserted between sheath 3 and wrappings 2, and spinnings 31 then electrically joined to sheath 3. Rings 23 and 26 are threaded over the insulating wrappings and the insert shield 7 threaded over one or other cable end. The two bared ends of the conductors 1 are brought together and the split clamp 4 screwed up and soldered thereto. The insert shield 7 is then forced over the bracket or spoked center 6 of the clamp. The insulating cylinder 9 is slid over the insert shield 7 with which it makes a close fit and the wooden keys 19 inserted between the ends thereof and the insulating wrappings 2. Conductor leads 24 are attached to the metal rings 23 and after extension cylinders 15 have been placed and keyed the leads 24 are connected to the rings 25 and to the intermediate shield 13 and so on for the other rings and cylinders.

The end shells 32 are brought up against the insulated inserts 30 and the joint 33 wiped. The cylindrical shells 21 are slid into position over the end shells 32 (if not previously joined thereto) and in such movement are guided and positioned relative to the outermost insulating cylinder 18 by the spring guides 20. The joints 36 and 41 are wiped and the liquid insulation poured into one or other of the threaded holes 39, while the air escapes or is pumped from the other. A plug 40 or reservoir is then attached to one or other of the threaded holes 39.

The joint as shown and described is designed for connecting conductor cables of five hundred thousand circular mills and insulated for sixty-six thousand volts. The construction, however, is readily adaptable to other sizes and capacities of cables by mere change in dimensions of parts to correspond therewith.

It is apparent that my joint possesses the advantages of definite control of the electrostatic stresses whereby over-stressing of the insulating materials at any point is avoided, that the joint may be installed with facility and expedition by comparatively inexpert workmen, and that all parts, with the exception of the soldered joints, are factory made and accordingly subject to careful inspection and test before installation. Furthermore on account of the facility with which the parts may be assembled in position, it may be installed without introduction of deleterious foreign matter.

While I have shown and described the best embodiment of the invention known to me, I do not desire to be restricted thereto.

What I claim as new and desire to secure by Letters Patent of the United States, is:

1. An insulated joint for sheathed electric cables comprising an enclosing metal shell, cable sections bared of their sheaths adjacent the ends thereof and their conductors joined centrally of the shell, means connecting the ends of said shell to the sheaths of the respective cable sections, and means for establishing zones of predetermined differences of potential along the unsheathed cable sections between said conductor joint and the ends of the sheaths of the respective cable sections when the cable is under a given electrical stress.

2. An insulated joint for sheathed electric cables comprising an enclosing metal shell, cable sections bared of their sheaths adjacent the ends thereof and their conductors joined centrally of said shell, means hermetically uniting the ends of said shell with the ends of the sheaths of the respective cable sections, and means for establishing zones of predetermined differences of potential along the unsheathed cable sections between said conductor joint and the ends of the sheaths of the respective cable sections when the cable is under a given electrical stress.

3. An insulated joint for sheathed and insulated electric cables comprising an enclosing metal shell, cable sections bared of their sheaths for a distance from the ends thereof and their conductors joined centrally of said shell, means connecting the ends of said shell to the ends of the sheaths of the respective cable sections, a metal shield connected to the conductors at the joint thereof and extending over the ends of the insulation thereof, and means for establishing zones of uniform differences of potential along the unsheathed cable sections between said metal shield and the ends of the sheaths of the respective sections when the cable is under a given electrical stress.

4. An insulated joint for sheathed electric cables comprising an enclosing metal shell, cable sections bared of their sheaths for a distance from the ends thereof and their conductors joined centrally of said shell, means connecting the ends of said shell to the ends of the sheaths of the respective cable sections, a cylindrical metal shield encased in insulation and electrically connected to said conductors at the joint thereof, and having a diameter slightly greater than the unsheathed cable sections and means for establishing zones of uniform differences of potential along the unsheathed cable sections between said shield and the ends of the sheaths of the respective cable sections when the cable is under a given electrical stress.

5. An insulated joint for sheathed electric cables having solid insulation comprising, an enclosing shell, cable sections bared of their sheaths for a distance from the ends thereof and their conductors joined centrally of said enclosing shell, means connecting the ends of said shell to the ends of the sheaths of the respective cable sections, metal shields concentrically spaced about said cable sections and within said shell, and conductor rings spaced along the solid insulation on said conductor sections and respectively connected to said metal shields in the order of their distances from the joint between the conductor sections.

6. An insulated joint for sheathed electric cables having solid insulation comprising an enclosing shell, cable sections bared of their sheaths for a distance from their ends and their conductors joined centrally of said enclosing shell, cylindrical insulating barriers concentrically spaced about said conductor joint, metal shields carried by said cylindrical barriers, metal rings spaced along the solid insulation on said conductor sections, and means electrically connecting respectively said metal rings with the said metal shields in the order of their distances from the joint between the conductor sections.

7. In a joint for sheathed electric conductors having solid insulation, the combination with a cable section bared of its sheath for a distance from the end thereof, a metal spinning forced between the end of the unremoved sheath and the outer surface of the solid insulation, an insulating collar fitted upon the outer surface of said solid insulation and provided with an inset metal ring at one end electrically connected to said spinning.

In witness whereof, I have hereunto set my hand this sixth day of March, 1925.

EUGENE D. EBY.